United States Patent
Holmstrom et al.

(10) Patent No.: US 9,826,709 B2
(45) Date of Patent: *Nov. 28, 2017

(54) TEAT TREATMENT METHOD AND APPARATUS

(71) Applicant: DELAVAL HOLDING AB, Tumba (SE)

(72) Inventors: Kerstin Holmstrom, Tumba (SE); Henrik Olander, Tumba (SE)

(73) Assignee: DELAVAL HOLDING AB, Tumba (SE)

(*) Notice: Subject to any disclaimer, the term of this patent is extended or adjusted under 35 U.S.C. 154(b) by 107 days.

This patent is subject to a terminal disclaimer.

(21) Appl. No.: 14/764,590

(22) PCT Filed: Feb. 5, 2014

(86) PCT No.: PCT/SE2014/050142
§ 371 (c)(1),
(2) Date: Jul. 30, 2015

(87) PCT Pub. No.: WO2014/142728
PCT Pub. Date: Sep. 18, 2014

(65) Prior Publication Data
US 2015/0366156 A1    Dec. 24, 2015

Related U.S. Application Data

(60) Provisional application No. 61/761,308, filed on Feb. 6, 2013.

(30) Foreign Application Priority Data

Feb. 6, 2013 (SE) ...................................... 1350143

(51) Int. Cl.
*A01J 7/04* (2006.01)
*A01J 5/017* (2006.01)

(52) U.S. Cl.
CPC ............... *A01J 7/04* (2013.01); *A01J 5/0175* (2013.01)

(58) Field of Classification Search
CPC . A01J 5/007; A01J 5/0075; A01J 7/04; A01K 13/001
(Continued)

(56) References Cited

U.S. PATENT DOCUMENTS

| 6,055,930 A | 5/2000 | Stein et al. |
| 6,443,094 B1 | 9/2002 | DeWaard |

(Continued)

FOREIGN PATENT DOCUMENTS

| EP | 0 191 517 B2 | 8/1986 |
| EP | 0 536 836 A1 | 4/1993 |

(Continued)

OTHER PUBLICATIONS

International-Type Search Report, dated Aug. 6, 2013, from corresponding PCT application.

(Continued)

*Primary Examiner* — Lisa L Tsang
(74) *Attorney, Agent, or Firm* — Young & Thompson (57) ABSTRACT

An automatic teat treatment method and apparatus uses a control system and an associated robot apparatus with an arm that carries a treatment apparatus, to establish a treatment operation start time and establish the presence of an animal at a treatment location, and then (i) initiate detection of a spatial teat position of a first teat, (ii) register the spatial position, (iii) derive a dedicated teat-treating action, (iv) carry out the teat-treating action, and (v) successively repeat the initiating, registering, deriving, and treating steps once in respect of each teat until all teats are treated, where, when after the start time, a predefined point in time is passed before any of the preceding steps is completed, the method (Continued)

is interrupted and a default treating action for treating all remaining untreated teats is derived and carried out by the treatment apparatus and thereafter the robot arm is retracted.

16 Claims, 4 Drawing Sheets

(58) Field of Classification Search
USPC .... 119/14.02, 14.04, 14.08, 14.14, 651, 665, 119/670
See application file for complete search history.

(56) References Cited

U.S. PATENT DOCUMENTS

| | | | | |
|---|---|---|---|---|
| 6,532,892 B1 * | 3/2003 | Nilsson | ................ | A01J 5/0175 119/14.03 |
| 6,553,942 B1 * | 4/2003 | Eriksson | ................... | A01J 7/04 119/14.18 |
| 8,622,026 B1 * | 1/2014 | Dole | ......................... | A01J 7/04 119/14.18 |
| 2006/0196432 A1 | 9/2006 | Peacock | | |
| 2007/0101945 A1 | 5/2007 | Shumway | | |
| 2011/0168096 A1 | 7/2011 | Nieswand et al. | | |
| 2011/0245975 A1 | 10/2011 | Daubner et al. | | |
| 2012/0006269 A1 | 1/2012 | McCain et al. | | |
| 2012/0048207 A1 | 3/2012 | Hofman et al. | | |

FOREIGN PATENT DOCUMENTS

| | | | | |
|---|---|---|---|---|
| EP | 1 166 625 A1 | 1/2002 | | |
| EP | 1 520 468 A1 | 4/2005 | | |
| RU | 1777728 A1 | 11/1992 | | |
| SE | WO 2010023122 A2 * | 3/2010 | ............ | A01J 5/0175 |
| WO | 02/07098 A1 | 1/2002 | | |
| WO | 02/07505 A1 | 1/2002 | | |
| WO | 2008/030086 A1 | 3/2008 | | |
| WO | 2010/012625 A2 | 2/2010 | | |

OTHER PUBLICATIONS

International Search Report, dated Jul. 8, 2014, from corresponding PCT application.
Supplementary International Search Report, dated Mar. 27, 2015, from corresponding PCT application.

* cited by examiner

TEAT TREATMENT METHOD AND APPARATUS

BACKGROUND OF THE INVENTION

Field of the Invention

The present invention relates to an assembly comprising an apparatus for treating the teats of a dairy animal and more particularly to an assembly capable of conducting treatment of all teats of an animal within a limited time window. The assembly may advantageously be put into practice at dairy farming installations which include milking equipment and in particular, automated milking equipment. The invention may in particular be implemented before or after a milking operation. The invention may in particular be implemented at a rotary milking platform or at a stationary milking stall.

Description of the Related Art

It has long been practised to treat teats of a milking animal after milking by using a so-called teat dip. One purpose for the dipping of teats is to prevent infection by applying some disinfectant fluid such as iodine solution or other disinfectant solution. Particular fluids may be used which have other or additional effects such as for example to create a barrier around the teat in order to prevent ingress of contaminants which may otherwise lead to infection. The barrier may in particular be effective for a period of time to allow the teats' milk passage openings to fully or partially close themselves. In some cases, teat dipping after milking may be accomplished by spraying fluid on the teats. It has also been practised to treat teats of a milking animal before milking by applying a cleaning medium which may also be a treatment medium, especially a treatment fluid. This practice of dipping, or spraying or otherwise applying a treatment fluid to an animal's teats before or after milking can be referred to as pre- or post-treatment and is described for example in US patent application publication number 2007/0101945, which relates to teat dipping or spraying. A post-treatment has also been suggested in association with automated milking using a milking robot as described in patent application EP-A-0536836, wherein a spray nozzle is disclosed mounted at the end of a robot arm which also handles teat cups or in EP-A-1166625, in which a gripper type robot arm may grasp and manipulate a teat spraying device or teat dipping device.

An automated system for applying disinfectant onto a cow's udder while the animal travels on a rotary milking platform is described in U.S. Pat. No. 6,443,094. Improvements in the automated delivery of treatment fluids to teats have been suggested in US patent application publication number 2011/245975 or 2006/196432 by using image analysis for teat location or udder location. In particular, it has been suggested to use a time-of-flight camera at a rotary milking platform for generating images of an animal's udder region, which, when analysed, permit movement of a robot arm towards an individual animal's identified udder location in order to perform a treatment to, on or at the udder or teats.

In most known systems for pre- or post-treatment of an animal's teats, a standard uniform fluid applying procedure is universally applied to all animals. In the context of automated milking, the need for rapid execution of various automated operations can be important from a range of perspectives, including cost efficiency, considering that automated milking installations represent a significant capital investment and require maximum throughput utilisation in order to keep costs below acceptable limits. Other reasons requiring rapid execution of operations include minimum interference on and intrusion upon animals, thereby preferably reducing the scope for an animal's obstructive or adverse response to an operation. In the context of rotary milking parlours, for example where an operation is performed on a moving animal from a fixed location at a platform periphery, it can be important that a particular operation is performed inside a limited time frame in order to avoid slowing down the platform. It may be noted in this context that a slowing of the platform for one animal necessarily causes a hold-up of the platform and an increase in dwell time for all animals present. Similarly, at a fixed stall equipped with automated milking equipment, it can be of importance to deduce to a minimum the amount of time each animal spends at the stall, especially when milking has been finished or before it commences. This allows a greater productive utilisation of the capital installation.

As already mentioned, systems have been proposed for making a determination of udder position or teat positions for individual animals at the time of carrying out a teat treatment operation in order to improve the effectiveness of the treatment, by ensuring a reliable, more accurate targeting of the treatment area. It may be speculated that the improved accuracy of such techniques may in some cases lead to a lower consumption of treatment fluid by avoiding the need to apply a treatment medium such as fluid blindly and wastefully over a larger area than needed in order to ensure the minimum desired coverage. Nevertheless, the implementation of teat treatment equipment which comprises sophisticated teat position detection equipment such as 3D imaging cameras and associated image processing means for targeted application of treatment fluid, has brought, along with its increased complexity, also an increase in the minimum time needed for carrying out the relevant operation. Where improved teat treatment is achieved in association with sophisticated teat detection and location equipment, time delays can occur if, for whatever reason, there is a delay in determining teat positions. In automated post-treatment, this can lead to a delay in an animal's release from a milking stall. In automated pre-treatment, this can lead to a delay in starting milking. In both cases, the context of a milking platform, this can lead to a delay for all animals and operations on the platform. In both cases, in the context of a stationary milking stall, this leads to a delay in admitting subsequent animals, which may be waiting in a queue. Therefore, in spite of various advances made in the treatment of teats, it is desirable to still further improve the efficiency of teat pre- or post-treatment in association with milking, possibly or preferably, in an automated milking installation.

BRIEF SUMMARY OF THE INVENTION

Accordingly, the present invention provides a method and an apparatus as defined below. Additional non-limiting features of the invention are explained herein.

The method and apparatus may in particular be implemented in or in association with an automated milking installation such as a stationary automated milking parlour or a rotary milking platform with automated milking equipment. The method is performed using a pre- or post-treatment robot apparatus with a control system, which may in particular be a dedicated control system for the treatment apparatus or which may additionally comprise elements of a robot's own control system or which may be associated with elements of a robot's own control system. The control system of the treatment apparatus may in particular be connected to and exchange signals with a milking installation control system, whether of the stationary stall type or whether of the moving platform type. The apparatus may further comprise imaging apparatus and image processing apparatus associated therewith.

The robot is capable of carrying a teat-treating device on an arm thereof and may additionally carry an imaging apparatus such as a camera preferably on a same arm. A teat treating device may be any applicator for applying a treatment medium such as a treatment fluid to teats. In some embodiments a teat dipping device or a teat spraying device may be used for treating the teats. Accordingly a dipping device such as a dipping cup or fluid brushing device may be used or one or more spray nozzles may be provided. In the proposed invention, animals having any number n of teats $z_1$ to $z_n$, may be treated. Common examples include animals with two or four teats. The method comprises the initial step of establishing a start time $t_0$ for said pre- or post-treatment operation. The time $t_0$ may in particular be determined following an input signal from an associated milking installation control system, indicating that milking has been completed and that a relevant animal may be post-treated. The time $t_0$ may alternatively be determined following an input signal from an associated milking installation control system, indicating that an animal has entered a stall prior to milking. Alternatively, the time $t_0$ may for example correspond to the movement of an animal stall of a moving platform to a starting position for the pre- or post-treatment operation: in particular, a signal may be generated setting the time $t_0$ when a rotary platform moves to a relevant angular position for initiation of a pre- or post-treatment operation at a stall on the platform. When the time $t_0$ is established, there begins a searching phase of the pre- or post-treatment apparatus in order to establish the presence of an animal at a pre- or post-treatment location. This step may be effected by detecting the physical presence of the animal using any appropriate sensor. An appropriate sensor may include a camera such as for example a 3D camera or so-called time-of-flight (TOF) camera. Accordingly, the pre- or post-treatment apparatus may comprise or may be associated with a detection device for detecting the presence of an animal, which device may be an image capture apparatus such as a camera, more specifically a 3D camera, preferably oriented towards the relevant pre- or post-treatment location. The image capture apparatus may additionally comprise or be associated with a suitable image processing system capable of analysing captured images such as images from an animal stall.

The method further includes
(i) initiating automatic detection of the spatial teat position of a first one $z_1$ of said teats of said individual animal at said pre- or post-treatment location, preferably using said imaging apparatus and image processing apparatus. The spatial teat position may in particular be defined relative to a said reference point in relation to said animal and/or in relation to a pre- or post-treatment location, and:
(ii) registering the spatial position of said detected individual animal's teat, in particular, by storing said detected position in a register in or associated with the robot apparatus control system, and
(iii) deriving, e.g. by computing or calculating, by means of said control system, a dedicated teat-treating action for treating said teat. A suitable teat-treating action may be a fluid application action such as a spraying or dipping action for e.g. coating said teat with treatment fluid. The method further includes the step of (iv) initiating and carrying out said treating action of said detected teat at said detected spatial position, to thereby treat said teat, and
(v) repeating said initiating, registering, deriving, and treating steps i-iv once in respect of each successive teat $z_2$-$z_n$ of said animal until all its teats are treated and thereafter retracting the robot arm, preferably away from the animal, to a retracted position;

wherein if, after said start time $t_0$, a predefined point in time $t_d$ is passed before any of the preceding steps is completed, preferably with the exception of step iv in relation to the ultimate teat $z_n$, then said steps are interrupted and a default treating action which may be in the form of a default movement path of a treating device, for treating all remaining untreated teats, and in particular only the remaining untreated teats, is derived and carried out by the treatment apparatus and thereafter said robot arm is retracted, preferably away from the animal, to a retracted position. The retracted position of the robot arm may correspond to the starting position. The starting position of the robot arm may also correspond to a position for detecting the presence of an animal at a pre- or post-treatment location.

In relation to step (ii), the spatial position of a detected individual animal's teat may be registered, i.e. temporarily stored and used for and deriving, for example by means of a computation unit in the apparatus control system, a dedicated treating action for the relevant teat using a treating device.

In relation to step (iii), the step of deriving a dedicated treating action, e.g. for coating a teat with treatment fluid, may preferably encompass the control system automatically generating a movement action of the robot arm which may in particular serve to ensure that the robot arm, with a treatment device such as a spray nozzle or nozzles or such as a dipping cup or other applicator of treatment fluid or treatment medium, moves to a position e.g. a dedicated treating position, nearby a detected teat. In embodiments of the invention spray fluid may coat a teat when a spray nozzle or nozzles is/are actuated from the treating position. Preferably, the action must be effective at least to move said treating device—such as a spray nozzle or treatment fluid painting brush or other applicator such as a dipping device—to a dedicated treating position defined by, or nearby, or in relation to said registered spatial teat position of said detected teat.

In relation to step (iv), the step of initiating and carrying out said treating action of said detected teat may preferably include movement of said treating device at or about a dedicated treating position nearby or at a relevant detected teat position, although in some embodiments, a robot arm may hold one or more treating devices, such as spraying nozzles, stationary at or nearby the spatial position of said detected individual animal's teat. In some embodiments, a treating action may be in the form of a treating path through which the robot arm and at least one treating device is/are moved in order to treat the relevant teat. Preferably, a suitable treating action may be a spraying action of treatment fluid from a treating device which may comprise one or more spraying nozzles. The spraying action, whether from a stationary robot arm position or from a moving robot arm, may thereby treat said teat e.g. by coating it with treatment fluid. To this end, fluid may be sprayed onto or around the teat and may be issued from a single nozzle or from multiple nozzles. A dedicated spraying path in relation to a teat may in particular be such that when fluid is passed through the nozzle during movement thereof through said dedicated spraying path, the teat is coated with treatment fluid.

Preferably, the step of detecting the position of a first or subsequent teat may be carried out using imaging apparatus and image processing apparatus. By way of example, when using a TOF camera, the position of the camera in three dimensional space can be determined from a knowledge of the exact co-ordinates of the robot arm carrying the camera. The co-ordinates of a teat in three dimensions can be determined by means of camera image analysis combined with the determination of distance and angle of the portion of the camera image which is found to contain the image of a teat. There may be a need for additional images to be made or for repeated image analysis before all any teat or teats of an animal can be recognised in an image. The apparatus and method of the invention are intended to be able to make determinations of teat positions without relying on known physical data of individual animals such as stored animal data, in other words, the teat position determinations may be made using the image and image analysis information alone, combined with the relevant camera co-ordinates. Stored data available to the system and method of the invention may be restricted to general data concerning e.g. the approximate dimensions of the particular animal type or approximate expected locations of certain body parts of the type of animal in question i.e. its species or breed.

Preferably, the method and apparatus of the invention allow accurate treatment of an animal's teats. In embodiments, the invention allows accurate spray application of treatment fluid on each teat or accurate dipping of each teat. Moreover the treatment can be applied swiftly and is adapted to each individual animal to be treated. Furthermore the method and apparatus are adapted to any position of an animal which is present for treatment. Still further, the method and apparatus allow to avoid using excessive treatment fluid, by targeting the individual teats. In addition, the method and apparatus allow a reliably swift execution of a teat treatment by ensuring that the treatment is completed within a required time window. In some embodiments, the time window can be flexibly determined, for example when used in conjunction with a moving milking platform such as a rotary platform, the time window can be determined by the animal's presence at a pre- or post treatment location nearby a pre- or post treatment robot. In preferred embodiments, the pre- or post treatment apparatus, may be modular and autonomous, that is to say, it may be stand-alone and may be capable of operating at and in combination with a variety of different automated milking installations. If in occasional cases the most optimised possibility for treating the teats cannot be carried out as desired, because not all the teats positions can be found, then the method additionally foresees that the next best possible treatment action will be followed, making use of as much of the teat position information as is available, thereby ensuring that highest possible levels of treatment accuracy, low treatment medium consumption and speed of execution are always maintained.

In particular, according to the invention, the control system may be the robot's own control system or a control system of the installation or other suitable control system which in any case, is associated with said image processing system. The imaging apparatus may in particular be an image gathering device such as a camera in particular a 3D camera or time-of-flight camera known per se in the art. The imaging device may in particular be mounted, e.g. fixedly mounted, on an arm of the robot. In embodiments, one or more spray nozzles may be mounted on an arm of the robot.

According to aspects of the invention, a default treating action may be initiated when a current actual point in time $t_a$ is after the predefined point in time $t_d$ has passed and before a point in time $t_e$ is reached which may be called an end time or a robot retraction point in time. If a signal indicating that point in time $t_e$ is reached is received by the treatment apparatus control system while the treatment robot is in a deployed position, then the robot is immediately retracted to its retracted, or starting, position. Preferably, the treating action is completed before a point in time $t_e$ is passed, wherein the point in time $t_e$ corresponds to a latest point in time up to which the treating action may be permitted to continue before it must be halted. The time $t_e$ may thereby for example correspond to a point in time which is reached after a predefined maximum allowed treating time has elapsed. A point in time $t_e$ may in particular be a point in time when a robot arm carrying a treating device must be retracted from its deployed position. In some embodiments, this point in time may be a predetermined point in time which defines the maximum allowable time period after $t_0$ during which a treatment action may be carried out. It may, depending on embodiments, define the end of a maximum time period from a time $t_0$ or a maximum time from an early warning time $t_d$ or in some embodiments—e.g. at a rotary platform: it may define the beginning of a minimum time before a subsequent pre- or post-treatment operation is to begin.

In some embodiments, an additional point in time may be prescribed after time $t_0$ and before a teat-treating operation is initiated. A time $t_s$ may be specified as a point in time which marks the expiry of a permitted searching period in instances where no animal has been found, or where a body part of the animal which would allow a robot arm end effector to be guided to an operative position, cannot be located. For example, a robot movement guidance system within the control system of a teat treatment apparatus may rely upon identifying the spatial position of a leg or an udder (or both) of a relevant animal at a pre- or post-treatment location in order to determine whether there is enough space to enable movement of a robot arm to an operative position underneath its udder. If there is found to be enough space, i.e. a so-called "entry window", allowing robot access to an operative position, then the robot arm end effector (i.e. the treating device) may move along an approach path to the required location. In some embodiments, a guidance system may for example search for two legs or two legs and an udder in order to determine the available space and to allow a robot arm end effector to be brought into its operative position. In alternative embodiments, an end effector such as a treating device may be moved to an animal's udder from a position to the side of the animal, necessitating an entry window to be determined on the basis of detecting an animal's nearest hind leg and its udder, possibly as well as portions of its side- or underbody. The space requirement allowing an approach path to an operative position beneath an animal's udder may be referred to as a "window" or "entry window" and may typically be determined using image-analysis. Hence, the point in time $t_s$ may be used to define the end of the permitted search period, irrespective of which necessary search steps are to be performed in respective embodiments. In a stationary milking stall, the permitted search time may be set to expire at time $t_s$ in order to terminate an unsuccessful search operation without causing undue delay. In embodiments in which a treatment apparatus is associated with a moving animal platform, the search time $t_s$ may correspond to an angular position of a platform and/or within a relevant stall on the platform which, after it has passed by a certain position in relation to the treatment apparatus, would no longer allow enough time, at normal platform rotation speed, to permit subsequent robot deployment to an operative position, teat position identification and a treating action to be performed before the platform would have passed its treatment location nearby the treatment apparatus.

In embodiments, the start time $t_0$ may be set by the control system when a trigger impulse is received in the control system indicating that a pre- or post-treatment is required to be performed. To this end, the pre- or post-treatment apparatus may be connected to an external sensor or signal generator, possibly in association with a milking apparatus such as an automated milking stall of a milking platform. In embodiments in which a pre- or post-treatment apparatus is associated with a moving platform, a signal generator providing input signals to the treatment apparatus control system may be associated with a movement sensor arranged to sense movements of the platform. Signals transmitted to the control system of the pre- or post-treatment apparatus may in particular represent the platform's incremental or progressive movement and may serve to indicate the platform's current rotational position. The information may allow the exact rotational, angular position of each animal stall on the platform to be determined at any given moment in time. It will be understood that points in time, such as $t_0$ or $t_d$ or $t_s$ or $t_e$ may not always be separated by a constant time period when those points in time relate to respective platform or stall rotational positions because if a platform is momentarily paused between any two defined points in time, then the time between those defined points in time may vary. This applies in the context of a rotary platform although not necessarily in the context of a stationary stall. In effect, where points in time ($t_0$ etc.) are defined by platform angular rotational positions, then the time elapsed between the passage of the various angular positions corresponding to those points in time is determined by platform speed.

In embodiments in which a stationary treatment apparatus, i.e. an apparatus which is fixed to a floor or support location, is used in association with a rotating platform carrying animal stalls, the time $t_e$ may correspond to a time when retraction of a treatment arm is required in order to avoid a collision with an animal or with a neighbouring stall by virtue of the movement of the platform which may take a current animal stall out of range of the treatment apparatus. Thus, it may for example correspond to a point in time of a signal indicating that a moving animal platform has passed an angular position which defines the maximum extent of permitted robot end-effector travel during a pre- or post-treatment action. By way of example, a treatment robot may have a maximum reach, i.e. working range, which corresponds to the distance equivalent to 2.5 milking stalls. If a treatment arm is prevented from being retracted for any reason, after time $t_e$ is reached, then an emergency stop signal, halting a platform, may be generated. In other embodiments, e.g. in association with a stationary milking stall, there may be an alarm signal generated, as may be customary, when required robot movements are not able to be carried out for any reason. In embodiments in which a treatment apparatus is associated with a stationary milking stall or treatment stall, a so-called entry window allowing deployment of a robot arm to its desired operative position may be determined by detecting relevant body parts of an animal at a treatment location. If no suitable window is determined, then the apparatus my re-initiate a search procedure to find a window for as long as a point in time $t_s$ for ending searching operations has not been passed. If a sufficient window has been identified, then the robot arm may be moved to a relevant identified operating position. In embodiments in which a stationary treatment apparatus is associated with a moving platform, the process of determining a window may include identifying body parts of an animal at an early stage of a searching phase, and subsequently pausing until an animal is brought, by movement of the platform, into a position allowing movement of the robot arm to its desired operating position.

According to aspects of the method of the invention, a predefined time $t_d$ is selected and pre-set for the purpose of ensuring that in case the position detection and treating actions of respective teats of an animal at a pre- or post-treatment location is not completed before the time $t_d$ is reached, then the point in time $t_d$ is treated as an early warning and a default treating action is initiated in order to ensure that the treatment of all teats is completed before the deemed and and/or pre-selected end point in time $t_e$. The point in time $t_d$ may be selected to correspond to at least a maximum expected time after a most recent point in time $t_0$ for establishing the presence of an animal, moving a robot arm to an operative position and determining all spatial teat positions as well as treating each teat using a dedicated treating action. In embodiments, the point in time $t_d$ may be selected to correspond to at least double or at least four times a said maximum expected time. A maximum expected time may in particular be determined under normal uninterrupted operating conditions of the method and apparatus. In the present context, in embodiments of the invention, the operations to be performed in said maximum expected time may be those defined in steps (i) to (v) above. In further embodiments, additional steps may be included such as determining a reference location R or calculating or identifying a so-called entry window towards an animal's udder. In particular where the method of the invention is implemented in association with a rotary platform, the point in time $t_d$ may correspond to a rotational position of the platform and of a platform stall which lies a certain angular distance away from a rotational position of the platform corresponding to an end point in time $t_e$ at a same platform stall. This separation may be such that at a normal rotational speed of the platform, a period of time elapses between the passage of the respective stall positions $t_d$ and $t_e$. This period of time may be selected by adjusting the angular distance between the points $t_d$ and $t_e$ or by adjusting the platform rotation speed. Ordinarily, in embodiments of the method of the invention, the platform will have a predetermined target average rotational speed and an angular separation between the positions $t_d$ and $t_e$ on the platform selected such that the time period between their respective passage past a peripheral fixed location treatment robot will correspond to at least the time required to derive and carry out a default treating action of all teats of an animal at the relevant stall, assuming uninterrupted and normal operating conditions.

A reference location R in relation to the animal may be determined by the control system, preferably in association with the imaging apparatus of the treatment robot apparatus or alternatively in association with another sensing means such as an optical animal sensor or a physical animal sensor known in the art. The reference location R may in particular serve as a reference location in relation to which a first spatial teat position is defined. It may in particular provide a starting position for a treatment action such as a movement of a robot arm together with a spray nozzle carried thereon. In some embodiments, an operational reference location R may be determined in the vicinity of the animal at a pre- or post-treatment location. The reference location R may be any suitable reference position nearby the animal and may for example be a reference location in relation to the animal's udder and/or legs; it may in particular be a starting position for a pre- or post-treatment treating action and may preferably be determined using said imaging apparatus and image processing apparatus. Distances and movement actions to respective teats may be determined in relation to said reference location. In some embodiments, a reference point may be a standard reference location or datum for the pre- or post treatment location.

Whilst an additional point in time $t_s$ has been discussed as an optional aspect of the present invention, it will be understood that, in any case if at any time during the stages after $t_o$ and preceding or during teat position detection or during dedicated teat treating operations, a point in time $t_d$ is exceeded, then the current method step may be interrupted and a default treating may be carried out as described above or the method may be aborted.

In aspects of the invention, the step of searching for an animal at a pre- or post-treatment location may, after determination of the presence of an animal, be followed by determining a spatial reference location in relation to the animal. This may precede or it may follow the determination of a so-called entry window to an operational position or, a determination of a reference position may be carried out independently of any determination of an entry window. In some embodiments, it may be appropriate to determine a reference location at an operative position of a robot end effector (which may be a treating device). A reference location, in this context may be a reference point in space in relation to which the spatial teat positions are defined and/or it may be a starting position for a pre- or post-treatment treating action. A suitable reference point may be a reference location from which spatial teat positions may be detected using optical detection means such as a camera, 3D camera or TOF camera. The determination of a reference point may be made following an analysis of images of an animal's expected udder region preferably obtained by an image capture device and possibly at an early stage of a pre- or post-treatment operation immediately following a determination of the presence of an animal at a pre- or post-treatment location (sometimes referred to as a treatment location). A suitable reference location may be in particular defined in terms of a co-ordinate system at a pre- or post-treatment location, that is to say, it may be defined in relation to a pre- or post-treatment location, even while it may be selected to lie proximate an animal's udder. In some embodiments a default treating path may be defined in relation to a previously determined reference point R in relation to the pre- or post-treatment location or in relation to the determined position of an animal present at that location, in particular, having regard to the determined position (if any) of the animal's udder and possibly one or more of its legs. Hence, the initiation of the automatic detection of all the spatial teat positions may be conducted from a reference location R. The individual teat positions may be defined either in relation to the reference location R or in relation the relevant treatment location. One effect of the determination of the reference location R, in the context of a milking platform, may be to move the robot arm end effector, with an imaging device through a relevant "window" to a position R where it is positioned in fixed relation to the treatment location, i.e. in relation to the platform, or more specifically in relation to a relevant stall. The robot arm will thereafter be controlled in such a manner as to maintain its end effector portion in the reference location: this may be achieved by precisely co-ordinating the movement of the robot with that of the platform, including stopping the movement of the robot arm end effector in case the platform stops, perhaps momentarily, for any reason. Accordingly, in some embodiments, an operational reference point may be determined in the vicinity of the animal at a treatment location. The reference point may be any suitable reference position nearby the animal and may for example be a reference location in relation to the animal's udder and/or legs; it may in particular be a starting position for e.g. a pre- or post-treatment spraying or dipping action and may preferably be determined using said imaging apparatus and image processing apparatus. Distances and movement actions to respective teats may be determined in relation to said reference point. In some embodiments, a reference point may be a standard reference location or datum for the pre- or post treatment location. In embodiments, the teat position reference point may be at a central position between the animal's legs, and at a height between the udder and floor heights. In this context, the udder height may be taken as either the lowest point of an udder, not including teats, or lowest point of udder including all its teats. In case no opportunity can be found to move a robot arm through an identified window to a deployed position under an animal's udder before a point in time $t_s$ is passed denoting the compulsory end time of search procedures, then the method of the invention may be abandoned.

In some aspects of the invention, a stall on a platform may constitute a pre- or post-treatment location when it is accessible for working purposes by a stationary treatment robot at the platform periphery, i.e. the stall may be "in working range" of the robot.

In the present context, a pre- or post-treatment apparatus may comprise a robot having an arm which may be moved from a retracted position in which a sensor seeks to detect an animal's presence, to a deployed position from which the teat positions are detected or from which a teat-treating action is carried out.

In an embodiment of the invention, a default treating action may be derived, e.g. computed by said control system at or immediately after a time $t_d$ is passed. This ensures that the treatment method continues without delay even in situations in which the system has been unable to determine all the teat position data. This allows a default path to be implemented without delay.

In a further feature, during the step of carrying out a treating action of a detected teat, the control system in association with an imaging device of the pre- or post-treatment apparatus may be active in acquiring and analysing images of the individual animal's udder region in order to detect further teats and their spatial teat positions.

In still further embodiments, the default treating action for each remaining undetected or untreated teat may be computed by estimating the position of any and all undetected teats using data comprising the spatial positions of detected teats. The approximated spatial locations in lieu of any undetected teat positions may be computed by estimating the position of any and all undetected teats using data comprising the detected spatial positions of the detected teats. In particular, basic, general, non-individual data held in a memory of the apparatus control system may comprise an algorithm for detecting remaining teat positions on the basis of detected teat positions. There may be a specific algorithm to be implemented depending on which one or more teat positions have been confirmed to have been detected.

In a further feature, approximated spatial locations in lieu of any undetected teat positions may be determined by normalising acquired spatial position data from an imaging apparatus and using look-up tables comprising normalised teat position data stored in a memory associated with a control system. Accordingly, the determined spatial position of one or more particular teats may correspond to presumed positions of any unidentified teat positions as set out in look up data tables.

According to a further feature, an approximated spatial location in lieu of a said undetected teat position may be derived by assigning said undetected teat to a position corresponding to a mirror image position of its detected opposite teat. In this context, the term "opposite teat" may mean, for a front left teat: the front right teat or vice-versa, and for a rear left teat: the rear right teat or vice-versa. The mirror plane may in particular be a virtual plane dividing the left and right halves of the animal and may be being computed by the image processing apparatus and/or by a control system or other sensor. Additionally, there may be derived, from the detected spatial positions of the legs, a central plane bisecting the space between said legs; and there may be derived, from a detection of the spatial position of the animal's udder, the udder height, e.g. it's height from the floor and/or the distance of the udder away from the imaging apparatus.

Optionally, prior to the previously mentioned step (i) of initiating automatic detection of the spatial teat position of a first one of said teats, an entry window to the udder region of a relevant animal at said treatment location may be detected using image capture and image analysis means of said pre- or post treatment apparatus.

In certain embodiments, if, after a start time $t_0$, a time $t_s$ denoting the latest point in time before which searching for an animal at a treatment location or searching for a said reference location or moving a treating device on a robot arm to a said reference position must be completed, is earlier than a current time $t_a$, the method may be interrupted and not further performed. This may be necessitated in situations in which a robot end effector for treating teats is not able to be moved to the required operative position near an udder inside a required minimum time frame, i.e. before time $t_s$ is passed.

According to a further feature, the method may include the steps of detecting the spatial positions of the animal's hind legs and udder and deriving therefrom a said reference point R. In particular, there may be derived, from the detected spatial positions of the legs, a central plane bisecting the space between said legs; and there may be derived, from a detection of the spatial position of the animal's udder, the udder height, e.g. it's height from the floor and/or the distance of the udder away from the imaging apparatus. Advantageously, a teat position reference point may be at a central position between the animal's legs i.e. in a central plane passing between the animal's respective pairs of legs, and at a height between the respective udder and floor heights. Alternatively, the method may include the steps of detecting the spatial position of a portion of the animal's side- or underbody and one or more of its legs and its udder and deriving therefrom a said reference point R.

Optionally, spatial positions of an individual animal's teats may be detected or derived or approximated without reference to historic data for the individual animal. According to the invention, it is not envisaged to use data relating to individual animal physiology, provided that some general information relating to the relevant species or breed may be stored and used as reference information e.g. for assisting in finding unidentified teat positions.

In a further aspect, the invention relates to an apparatus configured to carry out a pre- or post-treatment operation on the teats of an individual dairy animal. The apparatus comprises a pre- or post-treatment robot with an associated control system and is capable of carrying a teat treating device which may be a treatment fluid applicator such as a spraying nozzle or dipping device or other treatment medium applicator on an arm thereof. The apparatus may preferably comprise an imaging apparatus associated with image processing means. Other sensors for sensing the presence of an animal or its dimensions may also be suitable for the purpose of the invention. The teat treatment apparatus is configured to establish a start time $t_0$ for a pre- or post-treatment operation, to establish the presence of an animal at a pre- or post-treatment location, and optionally to determine a spatial reference point R in relation to said animal. It is further and further being configured to:
  (i) automatically detect the spatial teat position of a first one of said teats of said individual animal at said pre- or post-treatment location, and
  (ii) register the spatial position of said detected individual animal's teat, and
  (iii) derive, by means of said control system, a dedicated treating action capable of treating said teat, and
  (iv) initiate and carry out said treating action of said detected teat at said detected spatial position to thereby treat said teat, and
  (v) repeat said initiating, registering, deriving, and treating steps i-iv once in respect of each successive teat of said animal until all its n teats are treated and thereafter to retract the robot arm away from the animal to a retracted position which may be a starting position;
wherein the control system of the teat-treatment apparatus is configured to determine whether, after said start time $t_0$, a predefined time $t_d$ is passed before any of the preceding steps is completed, the control system being further configured such that, if the point in time $t_d$ is passed before any of the preceding steps is completed, it interrupts the method according to steps i-v and derives a default treating action for treating all remaining untreated teats, carries out said default treating action and thereafter retracts said robot arm.

In particular, the pre- or post-treatment apparatus of the invention may be configured to carry out the method which is defined and may be additionally configured to carry out additional optional embodiments as defined or described.

According to a further feature of the apparatus of the invention, there may be provided a device for detecting the passage of successive animal stalls on a nearby rotary platform. The device may in particular comprise an encoder for monitoring the platform position at any given time or on an ongoing basis. The encoder may transmit its output signals relating to platform position to the control system of the teat treatment apparatus. In some embodiments, the encoder may be associated with data comprising platform features at respective platform angles, thereby allowing the encoder to transmit platform feature information to the treatment apparatus control system as the platform moves progressively. Alternatively, the teat treatment apparatus control system may be capable of converting platform angular position signals from the encoder into relevant platform features.

Preferably, the apparatus of the invention may be configured to carry out any of the method steps or features described herein. In aspects of the invention, the robot of the teat-treatment apparatus may be "stand-alone", that is to say, it may be supplied independently of a rotary platform or automatic milking stall or other milking installation element. The robot may in particular comprise any suitable means for detecting the passage of successive platform stalls or the presence of an animal at a stall. The robot may in particular comprise an autonomous control system independent of an overall installation control system or database. The autonomous robot control system may in particular be capable of synchronising a part of the robot with a moving platform, thereby allowing the apparatus control system to operate the robot, and in particular a robot arm end-effector or treating device, as if the moving platform were a fixed environment. In general, the control system of the robot apparatus may not have access to animal identification data or other individual animal data.

According to aspects of the invention, imaging apparatus may either be provided integrally fixed on a robot arm it may be capable of being firmly grasped by a robot arm actuator.

According to further aspects of the invention, a time $t_d$ may be selected by a user and input into a robot control system and may correspond to an envisaged maximum time or platform angular movement after time $t_0$ has passed. Consequently, time $t_d$ may define a maximum available time for locating an animal and determining teat positions. According to further aspects of the invention, a time $t_s$ may be selected by a user and input into a robot control system and may correspond to an envisaged maximum time or platform angular movement after time $t_0$ has passed. Consequently, time $t_s$ may define a maximum available time for locating an animal and determining an entry window to a position nearby an animal's udder. The term "rotary platform" may include belt type moving platforms bearing stalls or it may include any conventional rotary platforms. In case no animal is detected, no treatment may be performed. In case no reference point can be derived from which to conduct teat detection or pre- or post-spraying, an alarm signal may be sounded.

Implementation of the present invention leads to reduced consumption of treatment fluid while preventing delays to the automated milking process as a whole.

Implementation of the present invention leads to reduced delays to the milking process as a whole, while lowering the consumption of treatment fluid.

Additional aspects of the invention will be described with reference to illustrations which show non-limiting examples of certain features and embodiments.

DETAILED DESCRIPTION OF THE PREFERRED EMBODIMENTS

Figure 3:
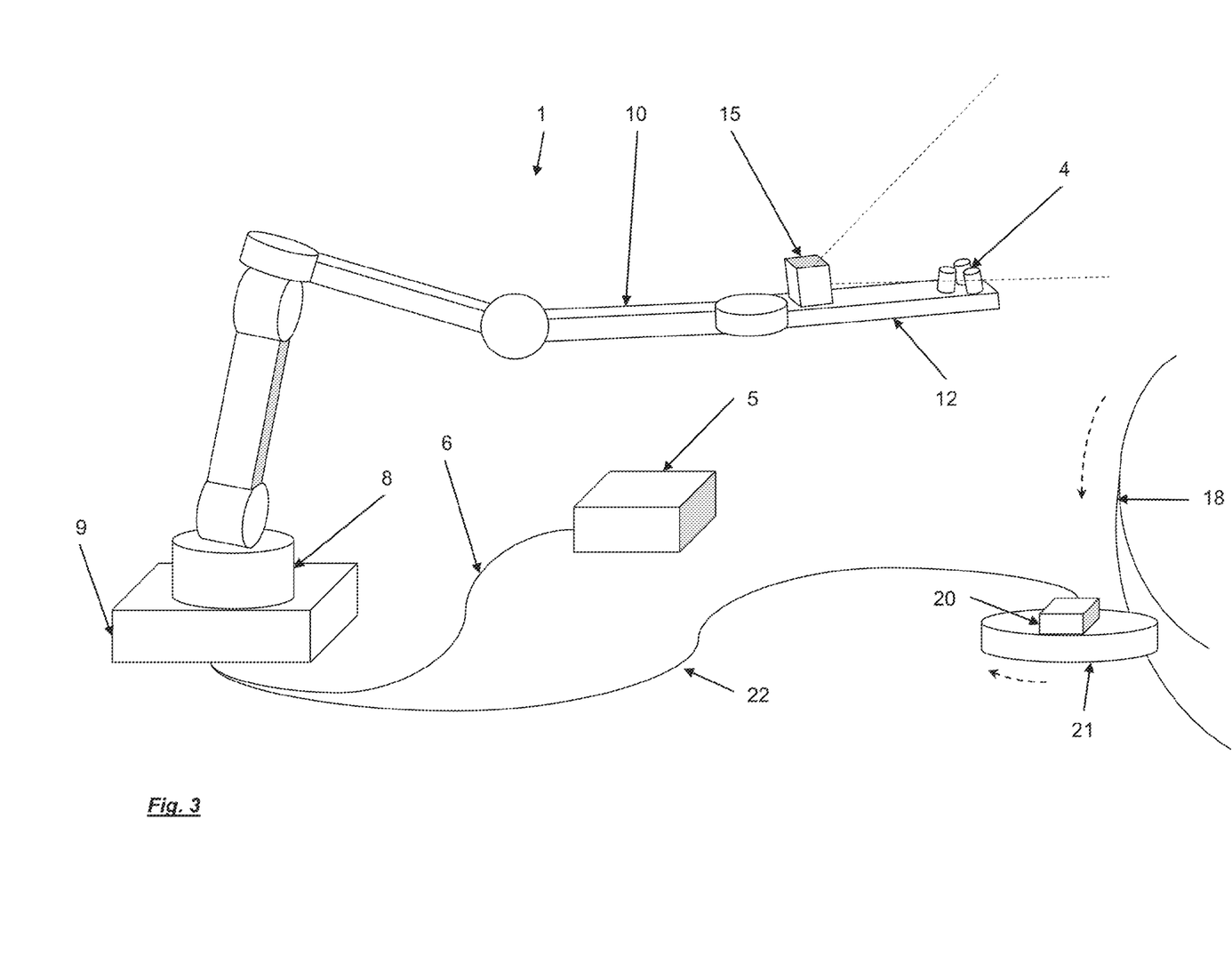
FIG. 3 shows a schematic illustration of a robot capable of implementing aspects of the present invention.

In FIG. 3, there is shown, schematically, a rotary platform 18 although the invention is not limited to embodiments at a platform and may include embodiments at a conventional fixed milking stall (not shown). The platform is shown in the present example for illustrative purposes only. A teat-treatment apparatus 1 is shown schematically by way of example in the form of an articulated robot having a fixed, stationary base 9 and movable arms 10. The basic robot construction may be of a known type and may comprise its own movement control system module 8. Associated with the robot is a control system 5 for the teat treatment apparatus and connected by a cable 6 or wirelessly to the robot. This control system 5 may be directly or indirectly associated with other control elements such as milking installation control elements (not shown) or sensors such as a platform movement sensor, illustrated in FIG. 3 in the form of an encoder 20 associated with an encoder wheel 21. Also the encoder is connected to the robot or to the control system 5 by means of a cable 22 or other wireless connector. Other sensors may be provided such as other physical sensors for detecting animal stalls or animals at the vicinity of the platform 18. The direction of movement of the encoder wheel 21 and of the platform 18 are indicated by dotted arrows in FIG. 3. The working area of the robot (i.e. its working range) may encompass an area corresponding to a sector of the platform 18 in the robot's vicinity, which may be considered to be a pre- or post-treatment location for the purposes of the present disclosure and which may by way of example extend across the size equivalent to approximately 2.5 milking stalls. Towards an extremity of the robot arm, there may be provided an end-effector shown in FIG. 3 schematically as a teat treating device 12 having an image capture device 15 and a treatment fluid applicator 4, which may be one or more spray nozzles, or a dipping cup or another type of treatment medium applicator such as a brush or set of brushes. As can be inferred from the illustration of FIG. 3, the encoder provides an ongoing means of reference for the control system 5 as to the rotational movement speed and distance of the platform and allows a determination to be made of the platform's angular position at any time. This also allows the control system to determine the exact location of each of the stalls on the platform 18 at any time and it further allows the control system 5 to determine which, if any, stall is momentarily at the robot's treatment location, i.e. within working range of the robot. The robot in FIG. 3 is shown in a partially deployed position, between a retracted [starting] position and a fully deployed, operational position in which the end effector would be above the platform 18 in the vicinity of an animal's udder.

Figure 2:
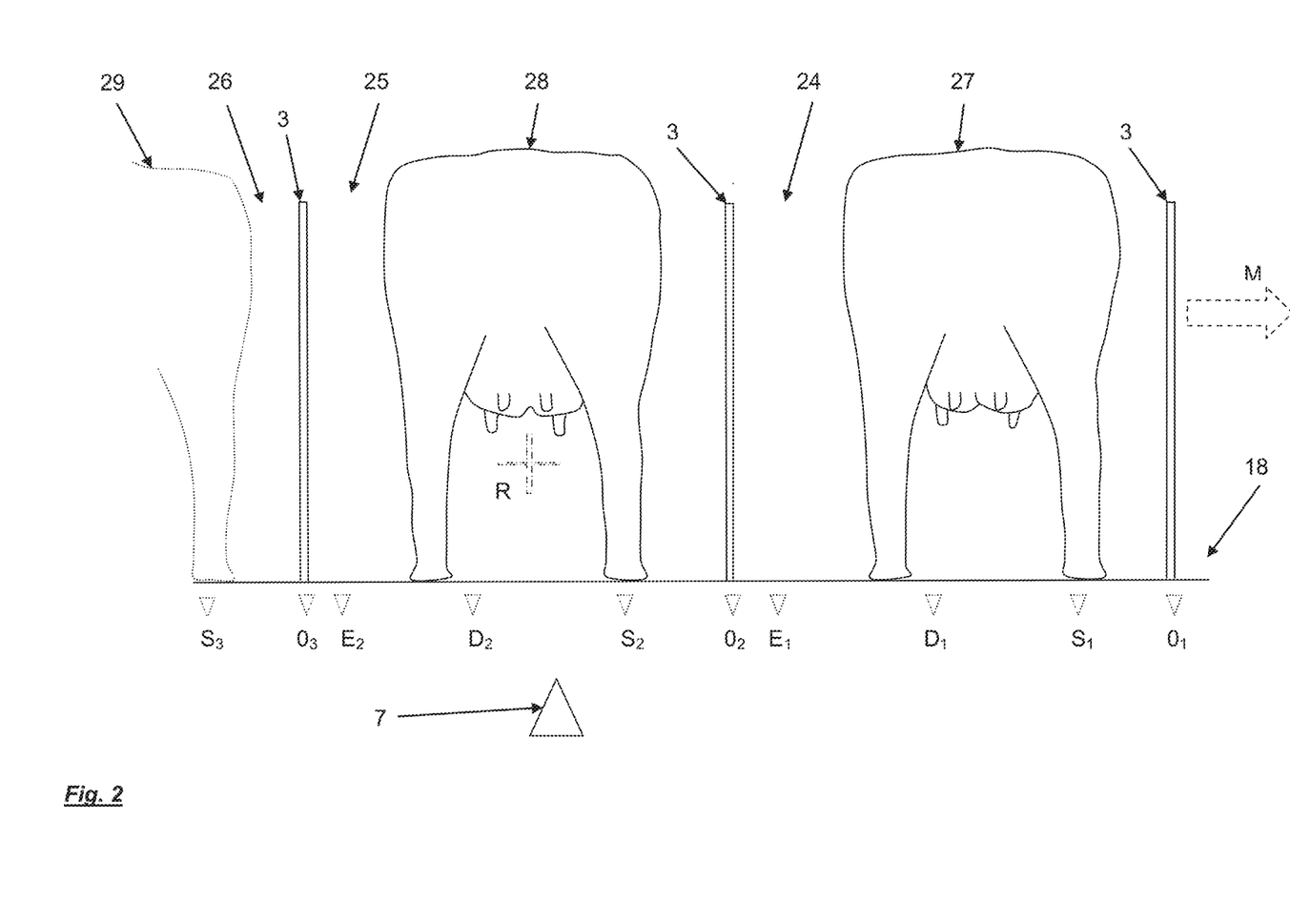
FIG. 2 shows a schematic illustration of a view of a moving animal platform for illustrating a possible implementation of the invention.

In FIG. 2 there is illustrated a partial schematic view of a platform 18 as seen from its periphery nearby a position 7 of a treatment apparatus 1. Three animal stalls 24, 25 and 26 are visible in the partial view, each separated by a respective bail 3 and each occupied by an animal 27, 28 or 29. Also shown is a series of points $O_1$, $O_2$, $O_3$ corresponding to successive points in time $t_0$ as the platform 18 moves them past the robot position 7; a series of points $S_1$, $S_2$, $S_3$ corresponding to successive points in time $t_s$; a series of points $D_1$, $D_2$, $D_3$ corresponding to successive points in time $t_d$; a series of points $E_1$, $E_2$, $E_3$ corresponding to successive points in time $t_e$ etc. A reference location R is indicated under the udder of animal 28 which occupies stall 25. The positions $O_1$, $O_2$, $O_3$ may not be visible on the platform 18 although they will be reference positions corresponding to particular platform periphery locations which will be registered by the apparatus control system 5 as the platform moves past the robot location 7. The direction of movement of the platform is indicated by the arrow M. From the approximate positions of the markings $O_1$, $O_2$, $O_3$, $E_1$, $E_2$, $E_3$ etc, as indicated in FIG. 2, it can be seen that if the platform moves at a more or less constant speed, then the minimum time available for the treating action corresponds to the time taken to move a relevant stall 24, 25, 26 through the distance between $D_1$ and $E_1$ (or $D_2$ and $E_2$ etc.) past a robot position 7.

Figure 1:
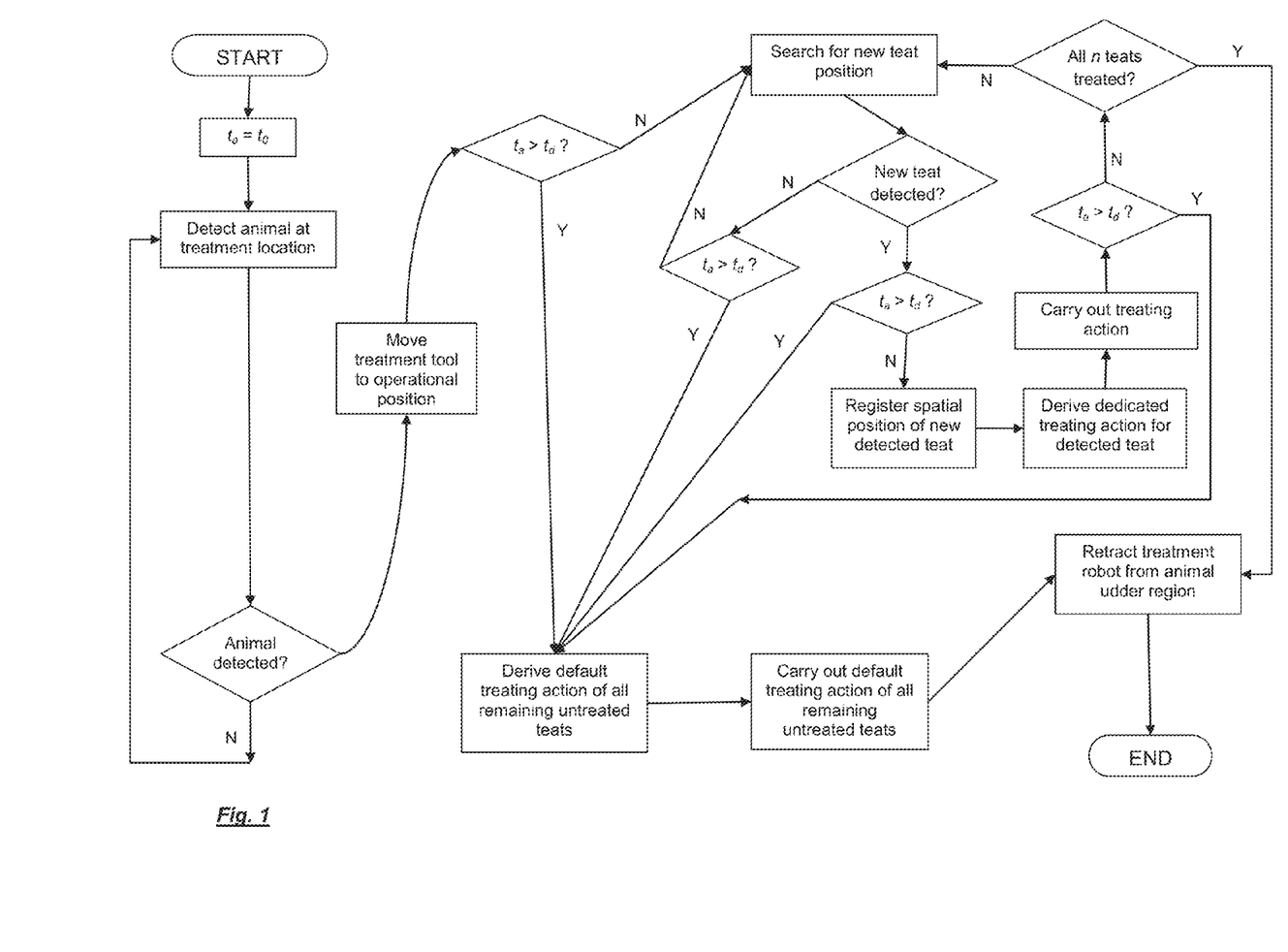
FIG. 1 shows a flowchart setting out some method steps according to one implementation of the invention.

The flowchart in FIG. 1 shows an illustrative method sequence according to the present invention. A discussion of the flowchart will be given in the context of the illustrations at FIGS. 2 and 3. When an encoder 20 generates a movement signal which leads to a position determination either in the encoder 20 itself or in the control system 5 indicating that a platform is in an angular position which brings a milking stall 24, 25 or 26 to a starting position for a treatment, then a $t_0$ signal is generated within the control system 5. Then actual time (current time) $t_a$ is considered to be a starting time $t_0$. This point in time may in particular coincide with a leading bail 3, as seen in the direction of platform movement, reaching a position at the working vicinity of the treatment apparatus 1 shown by way of example at position 7 in FIG. 2. At this point, the imaging apparatus 15 which may be a TOF camera or other 3D camera, would, from its retracted position 7 of the robot, be actively gathering image information for analysis by an associated image processor. From the information, a determination is made as to whether or not an animal 27, 28, 29 is present at a relevant stall in the vicinity of the robot (i.e. at a pre- or post-treatment location). As an alternative, according to the invention, any suitable known sensor device may be employed for ascertaining an animal's presence after time $t_0$ is recognised by the control system 5. If an animal is found, the control system 5 makes a determination of the animal's position using any relevant information from the sensors which are used. Provided a point in time $t_d$ has not been exceeded, the end effector 12 of the robot arm, carrying a treating device 4 is then moved to a working position in the vicinity of the animal's udder from which position additional visual information is gathered in the form of image information using imaging device 15, allowing for a determination of the spatial position of a teat of the animal, by means of associated image processing means. When a first teat position has been determined, and provided the latest permissible point in time $t_d$ for a completed detection phase has not passed, then a dedicated treatment action is derived which action takes into account the detected teat position and is then carried out. Following this, provided the point in time $t_d$ is not exceeded, the teat detection process is repeated after which, if a further teat position is found, that teat also is treated in the same way. During a dedicated treating action, the end effector 12 is moved though a treatment path allowing the treating device 4 to treat the relevant detected teat. The process is repeated for as long as any undetected or untreated teats remain, and for as long as the point in time $t_e$ is not passed. The process is stopped after all teats are treated, following which the robot arm is retracted to its starting position. According to aspects of the invention, the detection process for a subsequent teat position may be ongoing during dedicated treatment of an already identified teat. After the treatment is completed, or if a time $t_e$ is passed before it is completed, then the apparatus operation is interrupted and the robot is moved to its starting position out of the way of the animal 27, 28 or 29 and the stall 24, 25 or 26 which are being moved along by the platform. It may be noted that in the context of a moving platform 18, the time available between various points in time $t_0$, $t_d$ etc. may vary, depending on the speed of progress of the platform.

In case a predefined point in time $t_d$ is reached before the dedicated treating action is completed, then the control system 5 treats time $t_d$ as an early warning and the process of searching for successive teats is stopped in favour of determining a default treatment action to be performed in the remaining time available before the arrival of a point in time $t_e$. For performing a default treatment action, approximations for all remaining undetected teat positions are made based on data obtained from detected teats and utilising e.g. stored lookup tables or mirror-image mapping algorithms or any suitable algorithm for determining approximate teat positions on the basis of one or more detected teat positions. Data for algorithm or look-up table models may be general data available in particular for an animal species or breed although it is not envisaged, in the context of the present invention, to use data from an animal's individual file for this purpose.

It should be noted that the robot control system 8 may ensure that during image gathering and teat treating operations by the imaging device 15, when in an operational deployed position in the vicinity of an animal's udder, the end effector 12 is moved along in synchronisation with the platform. Thus, the end effector 12, during its image gathering operation, may be effectively motionless in relation to the platform stall.

It will be understood that the most efficient and effective treating action is the dedicated treating action, while the default treating action offers the best possible treatment in case one or more teat positions are not detected. The default treating action is likely to take longest and to use most treatment medium such as treatment fluid because of the need to treat one or more approximate teat locations in contrast to the more precisely defined detected teat locations. Nevertheless, the default treating action provides backup treating actions in respect of one or more undetected teat locations, which are likely to be required only in a minority of instances. The fewer undetected teat locations in a default action, the more swift and efficient will be the treating action overall. An advantage of the present invention is that generally speaking, a dedicated treating action can be implemented, saving on treating medium and ensuring an excellent treatment. In case the dedicated action cannot be performed, then instead of there being no treatment or a robot error, possibly stopping further progress of a platform or further operations at a stationary milking stall, the default treating action is implemented offering almost all the advantages of the dedicated action, in case only one teat is undetected or, if many teats are undetected, the default action may at least ensure that the relevant animal is treated and thereby avoid interrupting production.

Figure 4:
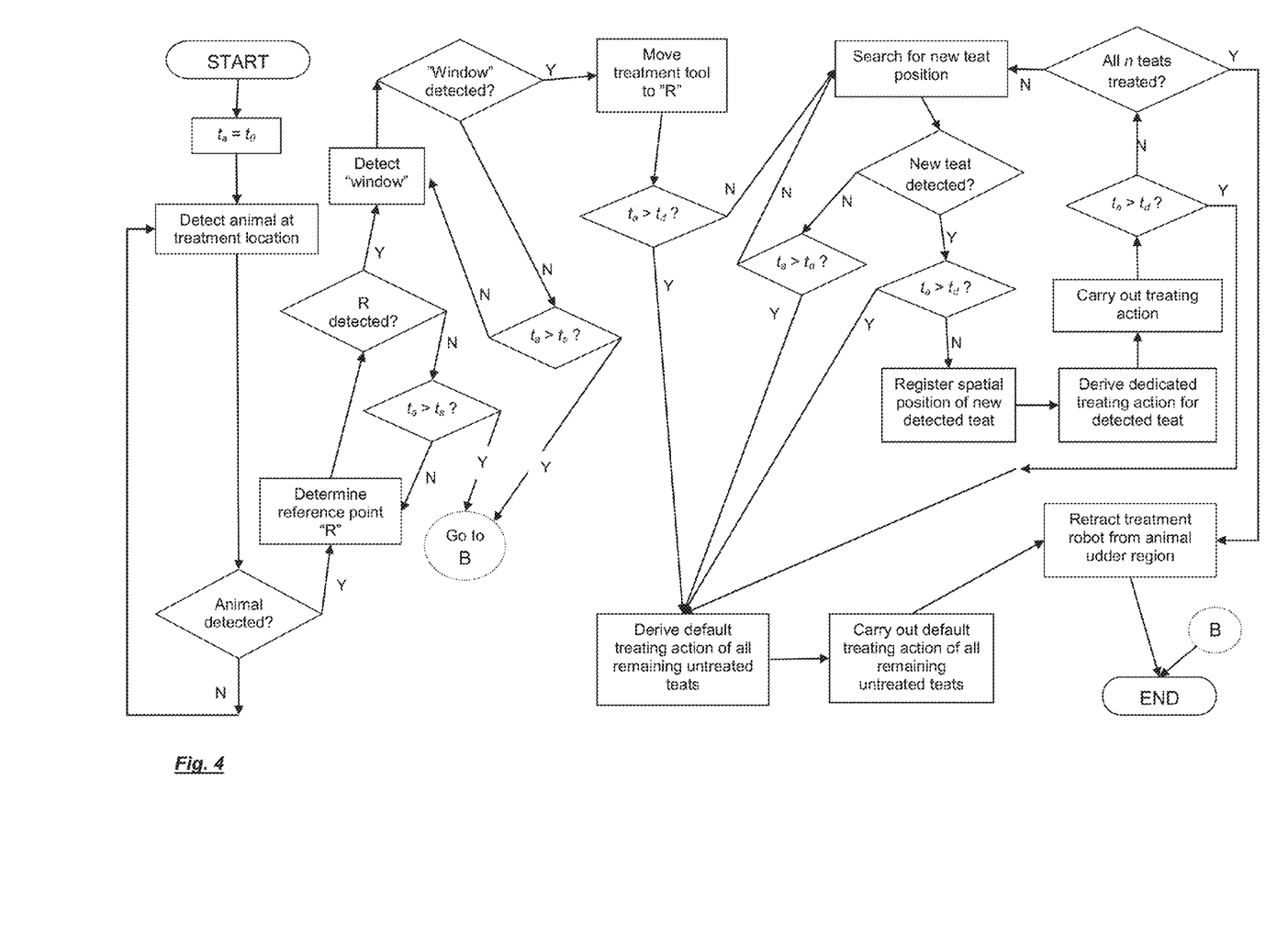
FIG. 4 shows a flowchart setting out some method steps according to a further possible implementation of the invention.

In FIG. 4, there is illustrated a flowchart of a method including some optional aspects of the invention. After detection of an animal at a pre- or post-treatment location, a determination of a reference location R is made, nearby the udder of the relevant animal. As discussed previously in this disclosure, the reference location R corresponds to a co-ordinate position in relation to the pre- or post-treatment location which puts the end effector 12 in the operational vicinity of the animal's udder for the purpose of both image gathering for teat position detection and to the purpose of providing a starting position for the treating action of the treating device 4 of the end effector (i.e. the treating device of the treatment apparatus 1). After the location R is detected, the imaging device 15 and its associated image processor attempt to determine a so-called entry window to the reference location R by calculating the space available around a path between the robot 7 and the reference location R. If there is calculated to be enough space to allow passage of the end effector 12 to the reference location R without contacting the animal, and provided time $t_s$, the latest point in time for completion of searching is not passed, then the robot is controlled to move the end effector 12 to that location R for the next stages of the method, as previously described, to take place. A robot arm end effector 12 may be held at position R, effectively motionless in relation to a moving platform stall, while the platform continues to move.

In some embodiments, the reference position R may be determined after a determination of an entry window has been made. In still further embodiments, an additional step (not represented) of analysing image information to assess whether a milking cluster is or is not attached to the animal's udder may be carried out. If a cluster is determined to be attached to the animal's udder, then in particular no post-treatment may be carried out. The animal in question might travel around the rotary platform (or "rotary") once again. In such a case, also no further pre-treatment would be carried out at a pre-treatment location owing to a cluster being detected on the animal's teats also at a pre-treatment location.

A further example of specific and optional aspects of the operation of a method and apparatus according to the invention may be as follows:

The teat treating system may be controlled by a number of interacting programs. One optional spray operation may include some or all of the following steps:

1. A robot manager program monitors the rotary platform movement. At one specified location per stall, a robot manager program of the treatment apparatus may send a start command to a robot controller program.
2. A robot controller program uses the information from a vision sensor (TOF camera) to determine whether an animal is present in the stall, whether a milking cluster is detached, and whether there is enough room for the robot arm to enter between the rear legs of the animal or—as the case may be—from the animal's side.
3. If an animal is present and other conditions are fulfilled, the robot may wait until the cow is directly in front of the robot at position 7. If not, operation may be aborted and a robot controller program may wait for the next start command (the next stall) indicating another point in time $t_0$.
4. When the animal is in front of the robot opposite position 7, the robot starts following the rotary platform movement, enters—possibly between the rear legs, or from the side—and uses the vision sensor to identify the teats. The position to where the robot enters is determined by the location of the udder. If the rotary starts reversing, the robot follows, keeping in the same position relative the moving platform.
5. After identifying the at least some of the teats, the robot moves to the teats one by one and sprays them individually. The teats are tracked by the vision system during the spraying.
6. After all teats are sprayed, the robot exits from underneath the cow, moving out from the rotating platform. The robot returns to the start position and may wait for the next start command from the robot manager program.
7. If the robot has not finished spraying all teats after following the platform a predefined number of degrees (e.g. at a point in time $t_d$), the robot control system may send an "early warning" command to the robot controller program. The robot then calculates a default spraying path to cover the remaining teats, runs the path and returns to start position.

There may also be a stop command sent at time $t_e$ by a robot manager program to abort all operations if the robot is still under the cow and is approaching the physical limit of its working range. If the robot by some reason is unable to complete the exit action in time, the platform may be stopped by triggering an emergency stop.

The platform motion may be measured and monitored with a standard encoder, possibly mounted on the inside or outside of the rotary platform in line with the working range (or working area) for the robot and relayed to the control system 5 of the treatment apparatus 1. The robot may in some embodiments use a separate encoder connected directly to a robot controller 8. Optionally, both encoders may be mounted on the same encoder wheel axis.

Next to the platform encoder 20, there may be provided a synchronization sensor which is triggered once per revolution. The synchronization signal may ensure that the apparatus control 5 system at every moment knows which stall is in front of the robot, and also exactly the relation between the robot and platform coordinate systems.

The vision guided robot motion may be divided into two subtasks; (i) locate animal and udder, and (ii) find individual teats. This image processing may operate on one set of images at a time, each set from one time sample. The identification and decision making using information from also previous time samples may be performed by robot controller program.

According to embodiments of the invention, the pre- or post-treatment apparatus may comprise a spray robot, having a treating device 4 in the form of one or more spray nozzles. The robot may be based on a standard 6-axis industrial robot mounted to the floor on the outside of a parallel type rotary platform. Modifications from a standard industrial robot may mainly consist of coating/sealing certain moving parts and interfaces as well as a communication interface and end-effector 12. The end effector may have a TOF camera pointing towards the centre of the rotary. The camera (and associated image processor) is used for identifying cow presence in the stall, it may additionally check for presence of a cluster or no cluster on an udder of a detected animal. If there is no cluster found, the camera and image processor may find a suitable opening between rear legs or under the animal from a side position and later finding the teats to be treated. Camera cleaning may be built in the end effector and may be performed automatically by a cycle of water and air sprayed at a camera housing viewing glass shield.

The end effector may in particular have three spray nozzles pointing upwards, to ensure enough spray capacity to coat the relevant teat and also to create a drip on the teat tip, while ensuring adequate coverage of the teat target area. The system may be controlled by a touch-screen graphical user interface placed outside the robot cell and allowing interactive control by an operator. A display screen may for example present the current status of the system and the success/failure of treatment operations.

Embodiments illustrated and described herein are non-limiting. Further and equivalent features within the scope of the claims will be apparent to one skilled in the art.

The invention claimed is:

1. An automatic teat treatment method for carrying out a treatment operation on teats of an individual animal having plural teats, said method comprising the steps of:
   using a control system, automatically establishing a start time t0 for said treatment operation, and establishing a presence of the animal at a treatment location; and
   (i) with a robot apparatus comprising a robot arm configured to carry a treatment apparatus, initiating automatic detection of a spatial teat position of one of said teats of said animal at said treatment location,
   (ii) registering the detected spatial teat position of said one of said teats of said animal, (iii) using said control system, deriving a dedicated teat-treating action for treating said one of said teats, said teat-treating action comprising a fluid application action that coats said one of said teats with at least one of a treatment fluid and a cleaning fluid, said fluid application action including at least one of a fluid spraying action, a fluid brushing action, and a fluid dipping action, (iv) with the robot apparatus carrying the treatment apparatus, using the treatment apparatus to perform said treatment operation on said one of said teats by initiating and carrying out said teat-treating action on said one of said teats at said detected spatial position, and (v) successively repeating said initiating, registering, deriving, and treating steps i-iv once for each other one of said teats of said animal until all of said plural teats are treated, and thereafter retracting the robot arm away from the animal to a retracted position, wherein if, after said start time t0, a predefined point in time td is passed without all of said initiating, registering, deriving, and treating steps i-iv being completed for said one of said teats, the method according to steps i-v is interrupted and a default treating action for treating all remaining untreated teats is derived and carried out by the treatment apparatus and thereafter said robot arm is retracted, the default treating action being a default fluid application action that coats said all remaining untreated teats with said at least one of the treatment fluid and a cleaning fluid, and wherein said robot apparatus is a pre-treatment robot apparatus or a post-treatment robot apparatus, said treatment apparatus is a pre-treatment apparatus or a post-treatment apparatus, and said teat-treating action is a pre-treatment operation or a post-treatment operation.

2. The automatic teat treatment method according to claim 1, wherein said default treating action is computed by said control system when or immediately after the predefined point in time td is passed.

3. The automatic teat treatment method according to claim 1, wherein, during said step iv of carrying out said teat-treating action, said control system in association with an imaging device of said robot apparatus are active in acquiring and analyzing images of an udder region of the animal for detecting a further one of said teats and spatial teat positions of the further one of said teats.

4. The automatic teat treatment method according to claim 1, wherein said default treating action is computed by estimating a position of all of said remaining untreated teats using data comprising the spatial teat positions of said one of said teats.

5. The automatic teat treatment method according to claim 1, wherein said default treating action is determined by estimating the spatial teat position of one of said remaining untreated teats, by assigning each said one of said remaining untreated teats to a position corresponding to a mirror image position of a detected opposite teat.

6. The automatic teat treatment method according to claim 1, wherein prior to said step (i) of initiating automatic detection of the spatial teat position, an entry window to an udder region of said animal at said treatment location is detected using image capture and image analysis using said treatment apparatus.

7. The automatic teat treatment method according to claim 1, wherein said method further includes, prior to said step (i) of initiating automatic detection of a spatial teat position, a step of determining a spatial reference point R in relation to said animal at said treatment location.

8. The automatic teat treatment method according to claim 7, wherein said method further includes steps of detecting, using an imaging apparatus and an image processing apparatus, the spatial position of i) at least one hind leg of the animal and ii) an udder of the animal, and deriving therefrom said reference point R.

9. The automatic teat treatment method according to claim 1, wherein said spatial positions of the teats of said animal are determined without reference to historic data for said animal.

10. The automatic teat treatment method according to claim 1, wherein said method is carried out using said robot apparatus in association with a rotary platform.

11. The automatic teat treatment method according to claim 1, wherein said robot apparatus is the pre-treatment robot apparatus, said treatment apparatus is [the pre-treatment apparatus, said teat-treating action is the pre-treatment operation, and said treatment location is a pre-treatment location located before a milking location.

12. The automatic teat treatment method according to claim 1, wherein said robot apparatus is the post-treatment robot apparatus, said treatment apparatus is the post-treatment apparatus, said teat-treating action is the post-treatment operation, and said treatment location is a post-treatment location located after a milking location.

13. An automatic teat treatment apparatus for carrying out a treatment operation on teats of an individual animal having plural teats, said apparatus comprising:
   a control system;
   a robot apparatus comprising a robot arm that carries a treatment apparatus, the robot apparatus associated with the control system;
   an imaging apparatus; and
   an image processing apparatus, wherein
   said control system, in operation, automatically establishes a start time t0 for the treatment operation, and establishes a presence of the animal at a treatment location, said control system configured to control functions of:
   (i) said robot apparatus automatically detecting a spatial teat position of one of said teats of said animal at said treatment location,
   (ii) registering the detected spatial teat position of said one of said teats of said animal,
   (iii) deriving a dedicated teat-treating action for treating said one of said teats, said teat-treating action comprising a fluid application action that coats said one of said teats with at least one of a treatment fluid and a cleaning fluid, said fluid application action including at least one of a fluid spraying action, a fluid brushing action, and a fluid dipping action,
   (iv) controlling said robot apparatus to use the treatment apparatus to perform said treatment operation on said one of said teats by initiating and carrying out said teat-treating action on said one of said teats at said detected spatial position, and
   (v) successively repeating said initiating, registering, deriving, and treating functions i-iv once for each other one of said teats of said animal until all of said plural teats are treated, and thereafter retracting the robot arm away from the animal to a retracted position,
   wherein if, after said start time t0, said control system determines when a predefined point in time td is passed without all of said detect, register, derive, and treat functions i-iv being completed for said one of said teats, then the functions i-v are interrupted and a default treating action for treating all remaining untreated teats is derived and carried out by the treatment apparatus and thereafter said robot arm is retracted, the default treating action being a default fluid application action that coats said all remaining untreated teats with said at least one of the treatment fluid and a cleaning fluid, and wherein said robot apparatus is a pre-treatment robot apparatus or a post-treatment robot apparatus, said treatment apparatus is a pre-treatment apparatus or a post-treatment apparatus, and said teat-treating action is a pre-treatment operation or a post-treatment operation.

14. The automatic teat treatment apparatus of claim 13, wherein said robot apparatus is associated with a rotary platform and detects passage of successive animal stalls on the rotary platform.

15. The automatic teat treatment apparatus of claim 13, wherein said robot apparatus is a stand-alone robot.

16. The automatic teat treatment apparatus of claim 13, wherein said imaging apparatus is provided on said robot arm.

\* \* \* \* \*